United States Patent
Wiles

(10) Patent No.: US 7,387,018 B2
(45) Date of Patent: Jun. 17, 2008

(54) DISCRETE VARIABLE VALVE LIFT DIAGNOSTIC SYSTEMS AND METHODS

(75) Inventor: Matthew A. Wiles, Royal Oak, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/561,041

(22) Filed: Nov. 17, 2006

(65) Prior Publication Data

US 2008/0120018 A1    May 22, 2008

(51) Int. Cl.
*G01M 15/00*    (2006.01)
(52) U.S. Cl. .......................................... 73/118.1
(58) Field of Classification Search .................. 73/116, 73/117.2, 117.3, 118.1, 119 R
See application file for complete search history.

(56) References Cited

U.S. PATENT DOCUMENTS

| | | | | |
|---|---|---|---|---|
| 7,047,924 | B1* | 5/2006 | Waters et al. | 123/90.16 |
| 7,146,851 | B2* | 12/2006 | Wakahara et al. | 73/117.3 |
| 2004/0129249 | A1* | 7/2004 | Kondo | 123/346 |
| 2005/0204805 | A1* | 9/2005 | Wakahara et al. | 73/118.1 |
| 2007/0265805 | A1* | 11/2007 | Lee et al. | 702/187 |

* cited by examiner

*Primary Examiner*—Eric S McCall

(57) ABSTRACT

A diagnostic system for a discrete variable valve lift system of an internal combustion engine is provided. The system includes: a Fast Fourier Transform (FFT) module that generates a frequency content signal based on a FFT method and a valve impact sensor signal; and a malfunction module that selectively diagnoses a malfunction of a discrete variable valve lift system based on the frequency content signal.

20 Claims, 5 Drawing Sheets

DISCRETE VARIABLE VALVE LIFT DIAGNOSTIC SYSTEMS AND METHODS

FIELD

The present disclosure relates to vehicle diagnostic systems and more specifically to diagnostic systems that detect malfunctions of components in discrete variable lift valvetrains of internal combustion engines.

BACKGROUND

Common modes of vehicular transportation may include internal combustion engines that generate drive torque based on a two or four stroke cycle. These internal combustion engines typically have a poppet valve arrangement to facilitate the induction and subsequent exhaust of combusted air and fuel.

For example, engines can operate based on the Otto air-standard thermodynamic cycle with real working fluids. The engine includes a poppet valve system coupled to a slider crank mechanism that forms variable volume in the rotational domain. A piston is stationary at the top of its travel (Top Dead Center—TDC) and begins to travel downward. An intake valve is selectively opened such that air can be inducted into the cylinder by the downwardly moving piston. During the induction process the inducted air mixes with a predetermined amount of fuel to form a combustible mixture. The intake valve closes at the bottom of the piston's cyclical travel (Bottom Dead Center—BDC). The piston reverses direction and then travels upward. The fuel-air mixture is compressed within the cylinders and is combusted when appropriate. Once at TDC, the piston reverses direction. Pressure rise during the quasi-fixed volume combustion process acts over the area of the piston and creates a differential force (this can be described as boundary work). This force is transmitted via the slider to the cranktrain. When coupled to a moment arm, this force forms motive torque. Once at BDC the piston stops and reverses direction. An exhaust valve is selectively opened (specifically the timing and lift) to allow the combustion products to be expelled from the cylinders by the upwardly moving piston. Once at TDC, the exhaust valve closes and the intake valve opens. The piston reverses direction and the mechanical cycle begins anew.

The rotation of a camshaft regulates the opening and closing of the intake and exhaust valves. On a multi-cylinder engine, the camshaft includes a plurality of cam lobes (typically one for each valve) that are affixed to the camshaft. The profiles of the cam lobes determine the profile of the valve lift and are kinematic-ally related by the geometry of the valvetrain. Important parameters associated with valve lift profiles include the period that the valve is open (duration) as well as the magnitude that the valve opens (lift). In the mechanical configuration described herein, these two parameters have significant influence on the gas exchange processes of ICEs.

Manufacturers typically incorporate a fixed valve lift schedule for the engine due to design complexity, cost, and durability constraints. From a gas exchange process perspective, a fixed valve lift schedule may not be optimal for all engine operating conditions encountered. For example, during steady-state highway travel a vehicle may typically require a motive torque that is significantly less than the full capacity of the powertrain. In typical fixed duration and lift valvetrain systems, this demanded load is usually meet via throttling of the engine. When a single (exhaust and intake) valve profile (duration and lift) are chosen for a particular powertrain, compromises are made to provide the best overall (based on load regimes) performance. Performance metrics may include specific torque and or fuel consumption. At these part-load operating conditions a significant amount of work is required to throttle the engine to insure that the proper amount of air into the engine to meet the desired road load.

A variable lift valvetrain can be described as one that has the capability of selecting multiple profiles (with variable duration and lift capability) associated with each intake and or exhaust valve(s). These profiles may be optimized for various load regimes and are specifically chosen to minimize the amount of work required for the gas exchange process and or to support multiple combustion modes.

A discrete variable valve lift (DWL) system enables the engine to operate on more than one intake and or exhaust valve lift schedule. More specifically, a DVVL engine system switches between different valve lift schedules based on the desired load of the engine. This has been shown to minimize pumping losses of the engine and or to support multiple combustion modes.

A malfunction of a DVVL engine system may occur when a component of the DVVL system fails to change to a different valve schedule on command. For example, a malfunction may occur when a switchable roller finger follower (SRFF) of the DVVL system switches from a low-lift (LL) valve schedule to a high-lift (HL) valve schedule thus causing one or more of the valves to fail to switch from the LL schedule to the HL schedule.

SUMMARY

Accordingly, a diagnostic system for a discrete variable valve lift system of an internal combustion engine is provided. The system includes: a Fast Fourier Transform (FFT) module that generates a frequency content signal based on a FFT method and a valve impact sensor signal; and a malfunction module that selectively diagnoses a malfunction of a discrete variable valve lift system based on the frequency content signal.

In other features, a method of diagnosing a discrete variable valve lift (DWL) system of an internal combustion engine is provided. The method includes, receiving an impact signal indicating an impact of a valve closing event; performing a FFT analysis on the valve signal to generate a frequency signature signal; and diagnosing a malfunction of the DVVL system based on the frequency signature signal.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application or uses. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Figure 1:
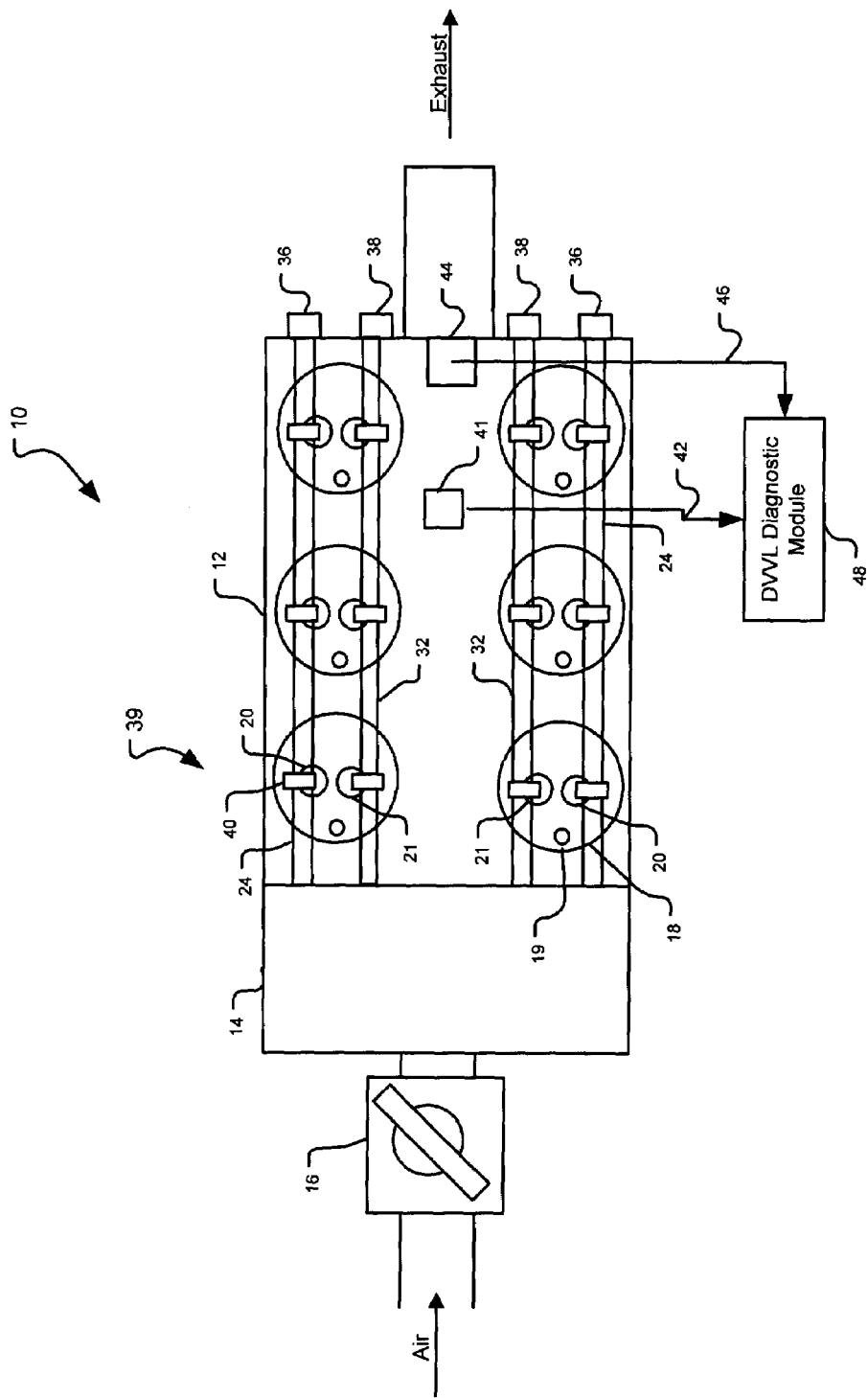
FIG. 1 is a functional block diagram of an exemplary six cylinder engine including a discrete variable valve lift (OWL) system.

Referring now to FIG. 1, an engine system 10 includes an engine 12 that combusts an air/fuel mixture to produce drive torque. Air is drawn into an intake manifold 14 through a throttle 16. The throttle 16 regulates air flow into the intake manifold 14. Air within the intake manifold 14 is distributed into cylinders 18. Although six cylinders are illustrated, the engine 12 may include additional or fewer cylinders 18. For example, engines having 2, 3, 4, 5, 8, 10 and 12 cylinders are contemplated. Although FIG. 1 depicts the cylinders in a v-shaped configuration, it is appreciated that the cylinders 18 can be implemented in an inline configuration. A fuel injector 19 injects fuel that is combined with air as it is drawn into the cylinder 18. A fuel injection system (not shown) regulates (timing, amount, etc.) the fuel injector 19 to provide a desired air-to-fuel ratio within each cylinder 18

According to an exemplary embodiment of the present disclosure, each cylinder 18 may include an intake valve 20 and an exhaust valve 21. The intake valve 20 selectively opens and closes to enable the air and or air/fuel mixture to enter the cylinders 18. Intake camshafts 24 regulate intake valve open and close events. The exhaust valves 21 selectively open and close to enable the exhaust to exit the cylinders 18. Exhaust valve open and close events are regulated by exhaust camshafts 32. Although a single intake valve 20 and a single exhaust valve 21 are shown per cylinder 18, multiple intake valves and multiple exhaust valves can be configured per cylinder 18.

A piston (not shown) compresses the air/fuel mixture within the cylinder 18. A spark plug (not shown) initiates combustion of the air/fuel mixture, which does boundary work and drives the piston in the cylinder 18. The piston drives a crankshaft (not shown) to produce drive torque. The crankshaft drives the intake and exhaust camshafts 24, 32 using a timing chain (not shown). It is appreciated that dual intake camshafts and dual exhaust camshafts may be implemented.

The engine 12 may include intake cam phasers 36 and exhaust cam phasers 38 that adjust the rotational timing of the intake and exhaust cam shafts 24, 32, respectively. More specifically, a phase angle of the intake and exhaust cam phasers 36, 38 may be retarded or advanced to control relative timing of the intake and exhaust camshafts 24, 32.

A discrete variable valve (DVVL) system 39 interacts with the camshafts 24, 32 to regulate valve open and close events. The DVVL system 39 includes a plurality of switching roller finger followers (SRFFs) 40. Each SRFF 40 includes a low-lift contact that interfaces with a low-lift cam lobe (not shown) affixed to the camshaft and one or more high-lift contacts (not shown) that interface with one or more high-lift cams lobes (not shown) affixed to the camshafts 24, 32. As the camshafts 24, 32 rotate, the cam lobes contact the SRFFs 40 which, in turn, open and close the respective valve or valves 20, 21. Each SRFF 40 is controlled such that the valves 20, 21 are selectively operated according to at least one of a low lift profile and a high lift profile.

At least one knock sensor 41 generates a knock signal 42 based on a closing event of the intake and exhaust valves 20,21. More particularly, the signal 42 is generated by sensing an impact of the valve 20, 21 on a valve seat (not shown). The knock sensor 41 may use a piezoelectric effect, which converts mechanical energy to electrical energy. More specifically, the piezoelectric effect occurs when stress is applied to a polarized crystal. Mechanical deformation of the crystal creates a current and with the aid of charge amplifier can be converted to a voltage. As can be appreciated the knock sensor 40 can be any piezoelectric device known in the art.

An engine speed sensor 44 generates an engine speed signal 46 indicating the rotational speed of the engine 12 in revolutions per minute (RPM). A discrete variable valve lift (DWL) diagnostic module 48 determines a malfunction of the DWL system 39 based on the knock signal 42 and the engine speed signal 46. More specifically, the DWL diagnostic module 48 determines if a SRFF 40 and/or SRFFs 40 are malfunctioning based on intake and exhaust valve 20, 21 operation. A DVVL malfunction is diagnosed based on an impact force on a valve seat caused by intake and exhaust valves 20, 21 during valve closing events.

Figure 2A:
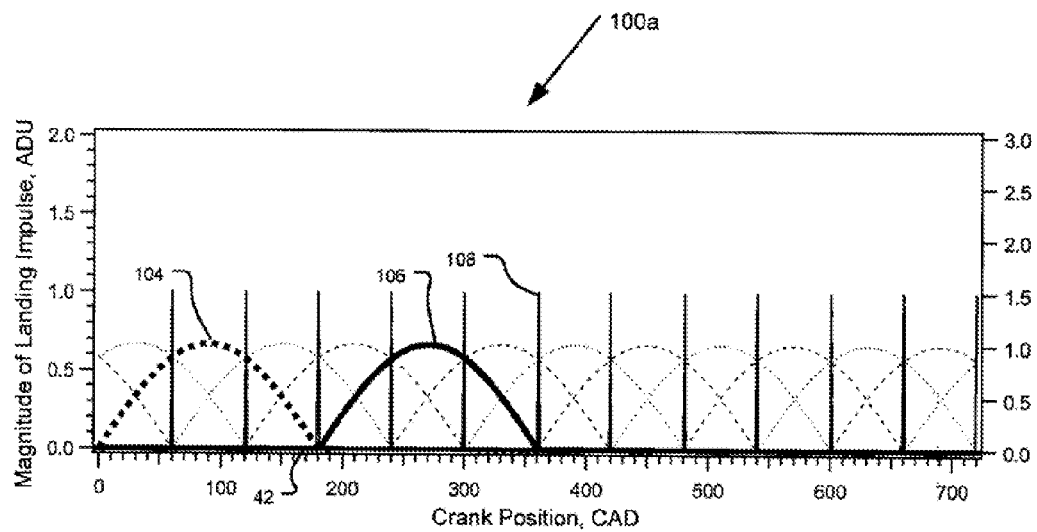
FIG. 2A illustrates an exemplary valve lift schedule of the OWL engine operating in high lift (HL) mode.

Referring now to FIG. 2A, a plurality of valve lift schedules 100a illustrate valve operation in high lift (HL) mode. More specifically, the valve lift schedules are based on a four-stroke, 6 cylinder engine operating at 1200 revolutions per minute (RPM). It is appreciated that one intake valve lift schedule and one or more exhaust valve lift schedule can be represented for each cylinder 18.

An exemplary intake valve lift schedule 104 and an exemplary exhaust valve lift schedule 106 for a single cylinder 18 are highlighted in bold. The knock signal 42 includes a plurality of finite impact signatures 108 that are associated with each valve closing event. More specifically a valve closing event occurs when the intake valves 20 or the exhaust valves 21 of a cylinder 18 close. Each impact signature 108 represents the magnitude of force exerted on the valve seat (not shown) during a valve closing event. More specifically, the valve seat (not shown) is the portion of the engine that the valve seals against when a valve is in a closed position.

According to FIG. 2A, the impact signatures 108 are approximately the same magnitude for all intake and exhaust valve closings in HL mode. The magnitude of the impact signatures 108 may vary based on, but not limited to the design of the cam lobes, a valve spring rate, a lash between the camshaft surface and the SRFF 40, and the sensitivity of the knock sensor 41 used to detect the impact.

Figure 2B:
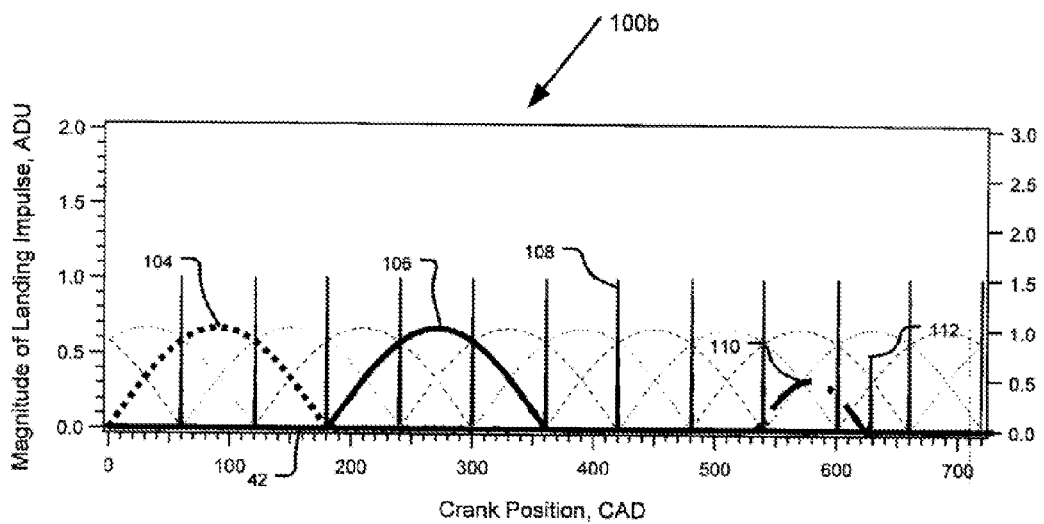
FIG. 2B illustrates an exemplary valve lift schedule DVVL engine operating in HL mode and a single valve lift failure.

Referring now to FIG. 2B, a plurality of valve lift schedules 100b illustrates valve operation in high lift (HL) mode, and a single valve failure due to a valve operating in LL mode. A valve schedule 110 illustrates a valve engaged in LL mode (during HL operation). An impact signature 112, which is generated based on the valve operating in LL mode, is of less magnitude than the impact signatures 108 generated from the valves in HL mode.

Figure 3:
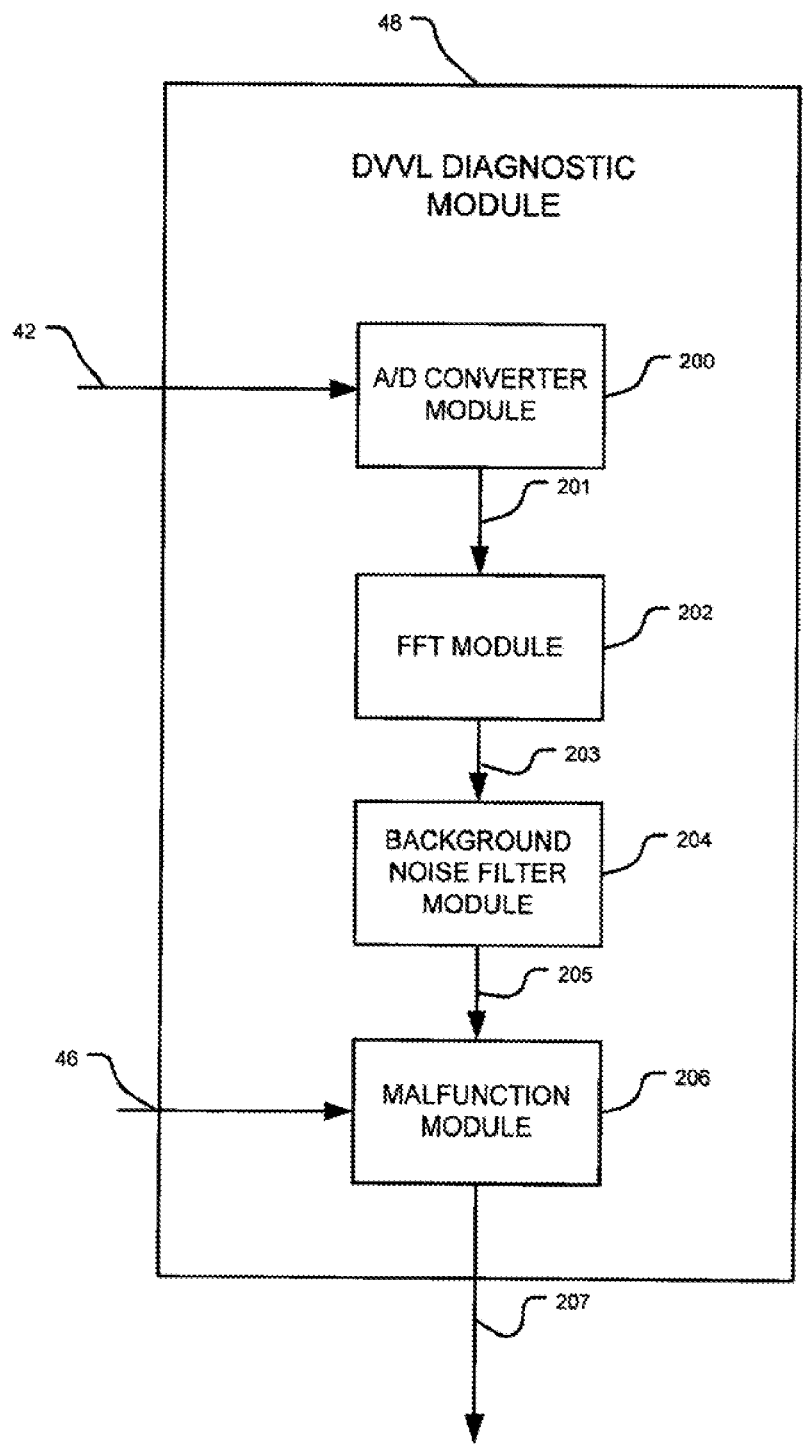
FIG. 3 is a functional block diagram of a DWL diagnostic system according to the present disclosure.

Referring now to FIG. 3, a block diagram illustrates various embodiments of a OWL diagnostic system that may be embedded within the OWL diagnostic module 48. Various embodiments of DWL diagnostic systems according to the present disclosure may include any number of sub modules embedded within the DVVL diagnostic module 48. The sub-modules shown may be combined and/or further partitioned to similarly diagnose a OWL system 39. In various embodiments, the OWL diagnostic system includes an analog to digital (A/D) converter module 200, a Fast Fourier Transform (FFT) module 202, a background noise filter module 204, and a malfunction module 206.

The A/D converter module 200 receives the knock signal 42 and converts the knock signal 42 to a digital knock signal 201. The FFT module 202 outputs a frequency signature signal 203 that quantifies the frequency content of the digital knock signal 201 using FFT analysis. The background noise filter module 204 eliminates the noise floor generated by the natural mechanical vibrations of the engine 12 from the frequency signature signal 203. More specifically, the background noise filter module 204 filters out frequency content from the frequency signature signal 203 below a predetermined magnitude and outputs a filtered frequency signature signal 205. The background noise filter module may also filter frequency content from the filtered frequency signature signal 205 above a second predetermined magnitude. The valve malfunction module 206 outputs a malfunction signal 207 when all of the frequency components of the filtered frequency signature signal 205 are not within a threshold frequency range. More specifically, the threshold frequency range is determined based on the engine speed signal 46.

Figure 4A:
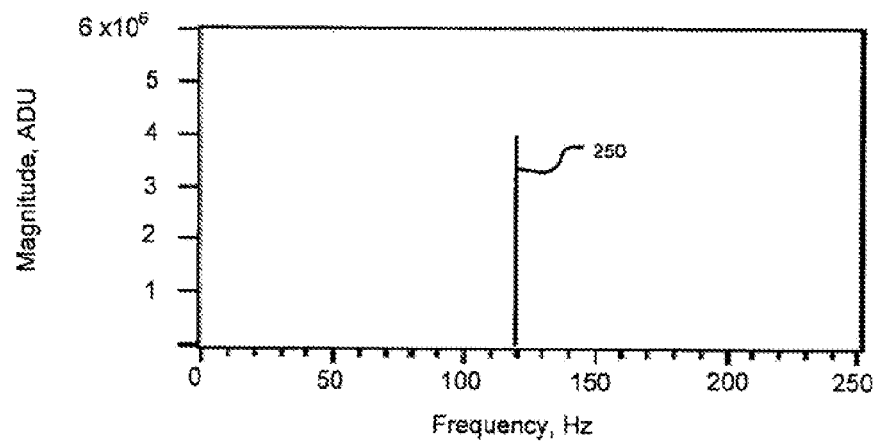
FIG. 4A illustrates frequency content of a filtered frequency signature signal based on the valve lift schedule in FIG. 2A.

Referring now to FIG. 4A, the frequency content of the filtered frequency signature signal 205 based on impact signatures 108 generated by the valve lift (and thus closing) schedules 100a is shown. A frequency component 250 occurs at 120 Hz., which represents the number of valve closing events per second.

According to an exemplary embodiment of the present disclosure, the engine 12 rotates at 1200 revolutions per minute (RPM) or 20 revolutions per second. According to FIG. 2A, there are twelve impact signatures 108 every 2 engine revolutions. Multiplying the number of engine revolutions per second by the number of impacts 108 per 2 engine revolutions, results in the number of impacts 108 per second or frequency of the HL valve impacts.

$$\frac{20 revolutions}{1 \text{ sec}} \times \frac{12 impacts}{2 revolutions} = \frac{120 impacts}{\text{sec}} = 120 \text{ Hz}$$

Therefore, the frequency component 250 occurs at 120 Hz.

Figure 4B:
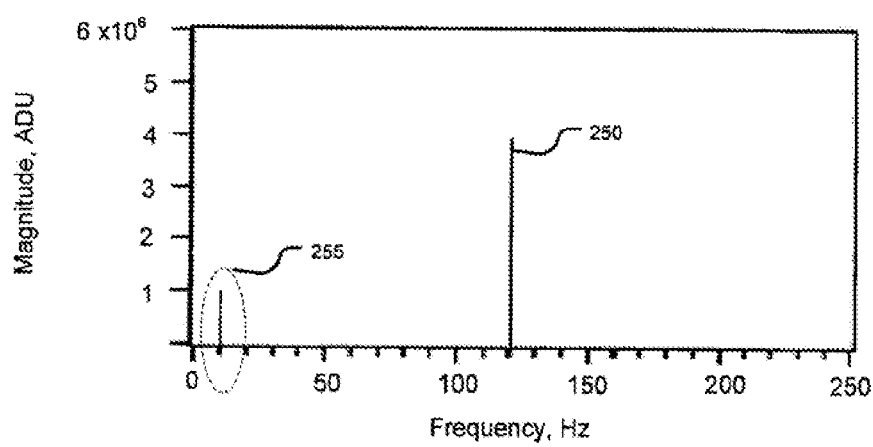
FIG. 4B illustrates frequency content of the filtered frequency signature signal based on the valve lift schedule in FIG. 2B.

FIG. 4B illustrates the frequency components of the filtered frequency signature signal 205 based on the twelve impact signatures 108 and an additional impact signature 112 generated from the plurality of valve lift schedules 100b shown in FIG. 2B. The frequency component 250 still exists at 120 Hz., however an additional frequency component 255 occurs at 10 Hz. Multiplying the number of engine revolutions per second by the number of impact signatures 112 per two revolutions results in the number of impacts per second or frequency of the LL valve impacts.

$$\frac{20 revolutions}{1 \text{ sec}} \times \frac{1 impact}{2 revolutions} = \frac{10 impacts}{\text{sec}} = 10 \text{ Hz}$$

Figure 5:
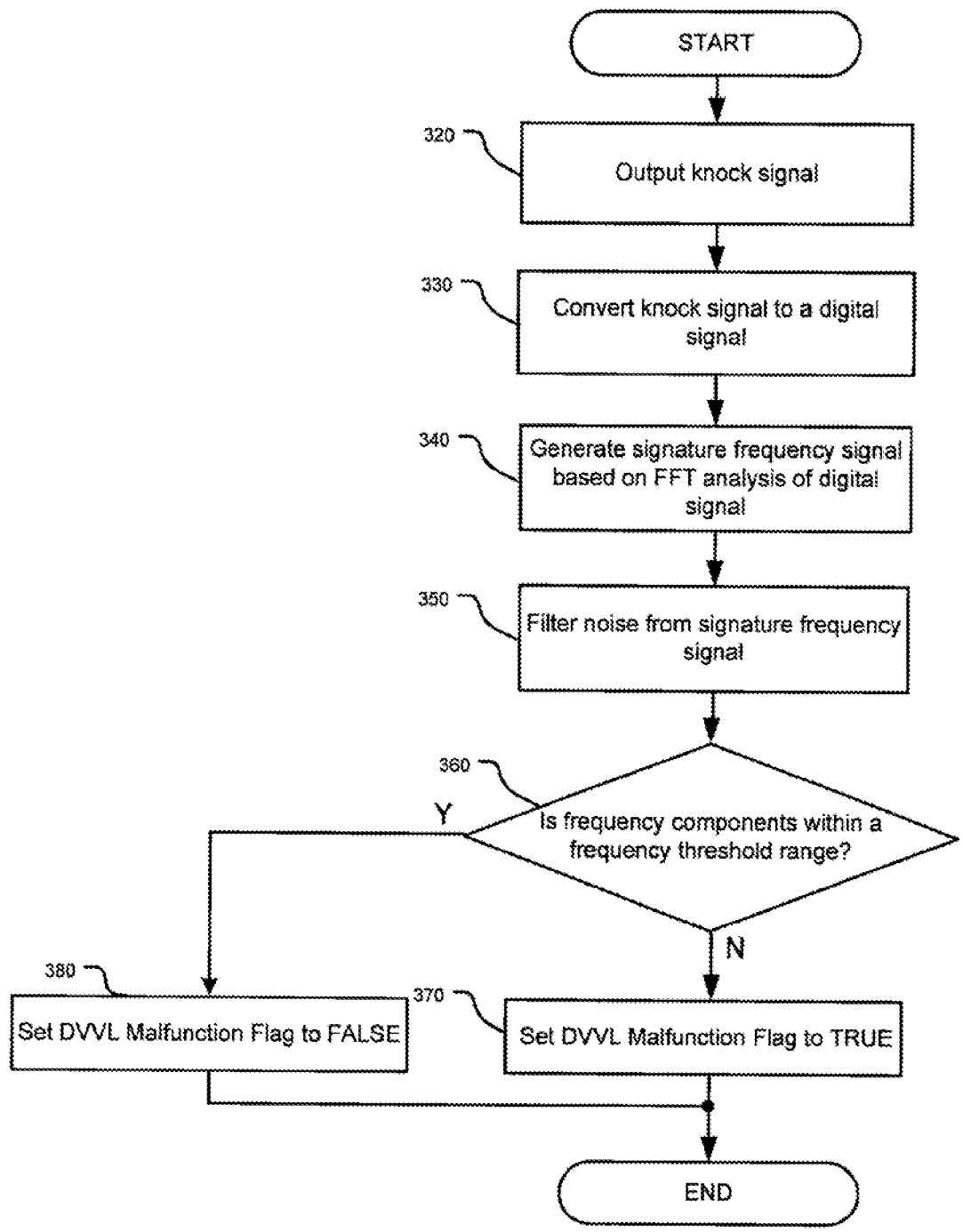
FIG. 5 is a flowchart illustrating a discrete variable valve lift diagnostic method.

Referring now to FIG. 5, a flowchart illustrates a DVVL method that may be performed by the DWL diagnostic system. The method may be run periodically during engine operation. It is appreciated that the DWL method is not limited to the sequential execution as shown in FIG. 5. Control processes the knock signal 42 that represents the impacts of the valve closing events during two engine revolutions at 320. Control converts the knock signal 42 to the digital knock signal 201 at 330. Control performs a FFT analysis on the digital knock signal 201 and outputs the frequency signature signal 203 at 340. Control filters the noise floor form the frequency signature signal 203 and outputs a filtered frequency signature signal 205 at 350. Control evaluates the frequency components of the filtered frequency signature signal 205 based on a frequency range at 360. If components of the filtered frequency signature signal 205 are not within a threshold frequency range, control sets the DVVL malfunction signal 207 to TRUE at 370, otherwise control sets the OWL malfunction signal 207 to FALSE at 380.

In various embodiments, after setting the DWL malfunction signal to TRUE a warning lamp is illuminated. Either additionally or alternatively, an audible warning signal can be generated by an audio system. In various embodiments, the OWL malfunction signal 207 includes or is a diagnostic code. Wherein the diagnostic code can be transmitted via a telematics system to a remote location or retrieved via a service tool (not shown) in communication with the engine system.

Those skilled in the art can now appreciate from the foregoing description that the broad teachings of the present disclosure can be implemented in a variety of forms. Therefore, while this disclosure has been described in connection with particular examples thereof the true scope of the disclosure should not be so limited since other modifications will become apparent to the skilled practitioner upon a study of the drawings, specification, and the following claims.

What is claimed is:

1. A diagnostic system for a discrete variable valve lift system of an internal combustion engine, comprising:
 a Fast Fourier Transform (FFT) module that generates a frequency content signal based on a FFT method and a valve impact sensor signal; and
 a malfunction module that selectively diagnoses a malfunction of a discrete variable valve lift system based on the frequency content signal.

2. The diagnostic system of claim 1 further comprising an analog to digital (A/D) converter module that converts the valve sensor signal from an analog signal to a digital signal and wherein the FFT module generates the frequency content signal based on the digital signal.

3. The diagnostic system of claim 1 further comprising a background noise filter module that filters the frequency content signal based on a maximum threshold and wherein the malfunction module selectively diagnoses the malfunction based on the filtered frequency content signal.

4. The diagnostic system of claim 3 wherein the background noise filter module filters the frequency content signal based on a minimum threshold.

5. The diagnostic system of claim 4 wherein the minimum and the maximum threshold values are determined based on engine speed.

6. The diagnostic system of claim 1 wherein the malfunction module sets a malfunction signal based on a frequency range.

7. The diagnostic system of claim 6 wherein the frequency range is based on engine speed.

8. The diagnostic system of claim 1 wherein the valve sensor signal indicates closing events associated with at lest one of a high-lift valve lift profile and a low-lift valve lift profile.

9. The diagnostic system of claim 1 wherein the malfunction module selectively diagnoses a malfunction based on a commanded valve lift schedule of the internal combustion engine.

10. The diagnostic system of claim 1 further comprising a piezoelectric device that generates an impact signal based on mechanical impact load on a valve seat.

11. The diagnostic system of claim 10 wherein the piezoelectric device is a knock sensor that outputs a knock signal indicating a force of impact on a valve seating caused by valves during valve closing events and wherein the sensor signal is the knock signal.

12. The diagnostic system of claim 1 wherein the malfunction module selectively diagnoses a malfunction of a switchable roller finger follower of the variable valve lift system.

13. A method of diagnosing a discrete variable valve lift (DVVL) system of an internal combustion engine, comprising:
   receiving an impact signal indicating an impact of a valve closing event,
   performing a FFT analysis on the valve signal to generate a frequency signature signal; and
   diagnosing a malfunction of the DWL system based on the frequency signature signal.

14. The method of claim 13 further comprising converting the valve signal from an analog signal to a digital signal and wherein the performing a FFT analysis is based on the digital signal.

15. The method of claim 13 further comprising filtering the frequency signature signal based on a maximum threshold.

16. The method of claim 13 further comprising filtering the frequency signature signal based on a minimum threshold.

17. The method of claim 13 wherein the diagnosing a malfunction comprises comparing the frequency signature signal to a frequency range.

18. The method of claim 17 further comprising setting a malfunction code when the frequency signature signal is outside of the threshold frequency range.

19. The method of claim 13 wherein the receiving further comprises receiving an impact signal generated by a piezoelectric device.

20. The method of claim 19 wherein the piezoelectric device is a knock sensor.

* * * * *